(12) United States Patent
Sato et al.

(10) Patent No.: US 11,985,461 B2
(45) Date of Patent: May 14, 2024

(54) WIRELESS MICROPHONE HOLDER, WIRELESS MICROPHONE CONNECTION METHOD, AND WIRELESS MICROPHONE SYSTEM

(71) Applicants: Yamaha Corporation, Hamamatsu (JP); RTX A/S, Noerresundby (DK)

(72) Inventors: Koichiro Sato, Hamamatsu (JP); Thomas Kristian Bogh Pedersen, Noerresundby (DK); Lars Klitgaard Andersen, Noerresundby (DK); Mads Berre Eriksen, Noerresundby (DK)

(73) Assignees: Yamaha Corporation, Hamamatsu (JP); RTX A/S, Noerresundby (DK)

( * ) Notice: Subject to any disclaimer, the term of this patent is extended or adjusted under 35 U.S.C. 154(b) by 33 days.

(21) Appl. No.: 17/654,756

(22) Filed: Mar. 14, 2022

(65) Prior Publication Data
US 2022/0295164 A1 Sep. 15, 2022

(30) Foreign Application Priority Data

Mar. 15, 2021 (JP) .................... 2021-040946

(51) Int. Cl.
*H04R 29/00* (2006.01)
*H04R 1/08* (2006.01)

(52) U.S. Cl.
CPC ........... *H04R 1/08* (2013.01); *H04R 2420/07* (2013.01)

(58) Field of Classification Search
CPC .............................. H04R 1/08; H04R 2420/07
USPC ........................................................ 381/344
See application file for complete search history.

(56) References Cited

U.S. PATENT DOCUMENTS

| | | | | |
|---|---|---|---|---|
| 8,744,087 | B2* | 6/2014 | Bodley | H04N 7/15 455/556.1 |
| 2007/0117556 | A1* | 5/2007 | Rogalski | H04M 1/72409 455/416 |
| 2007/0149246 | A1* | 6/2007 | Bodley | H04R 3/005 455/556.1 |
| 2013/0316752 | A1* | 11/2013 | Bodley | H04L 12/1827 455/517 |
| 2015/0341716 | A1* | 11/2015 | Desmarais | G01R 31/3835 381/150 |
| 2017/0230783 | A1 | 8/2017 | Toya | |

FOREIGN PATENT DOCUMENTS

| | | |
|---|---|---|
| JP | 2004-207866 A | 7/2004 |
| JP | 2017-143725 A | 8/2017 |

* cited by examiner

*Primary Examiner* — William J Deane, Jr.
(74) *Attorney, Agent, or Firm* — Crowell & Moring LLP

(57) ABSTRACT

A wireless microphone holder includes a storage device that stores identification information of a host device, a communication interface that communicates with the host device, and a processor configured to receive a pairing instruction to pair a plurality of wireless microphones with the host device, connect to the plurality of wireless microphones, and send the identification information to the plurality of wireless microphones. In a case in which the processor receives the pairing instruction, the processor sends the identification information and instruction information according to the pairing instruction to the plurality of wireless microphones connected to the processor, sends the instruction information to the host device, and mutually connects the plurality of wireless microphones and the host device.

18 Claims, 7 Drawing Sheets

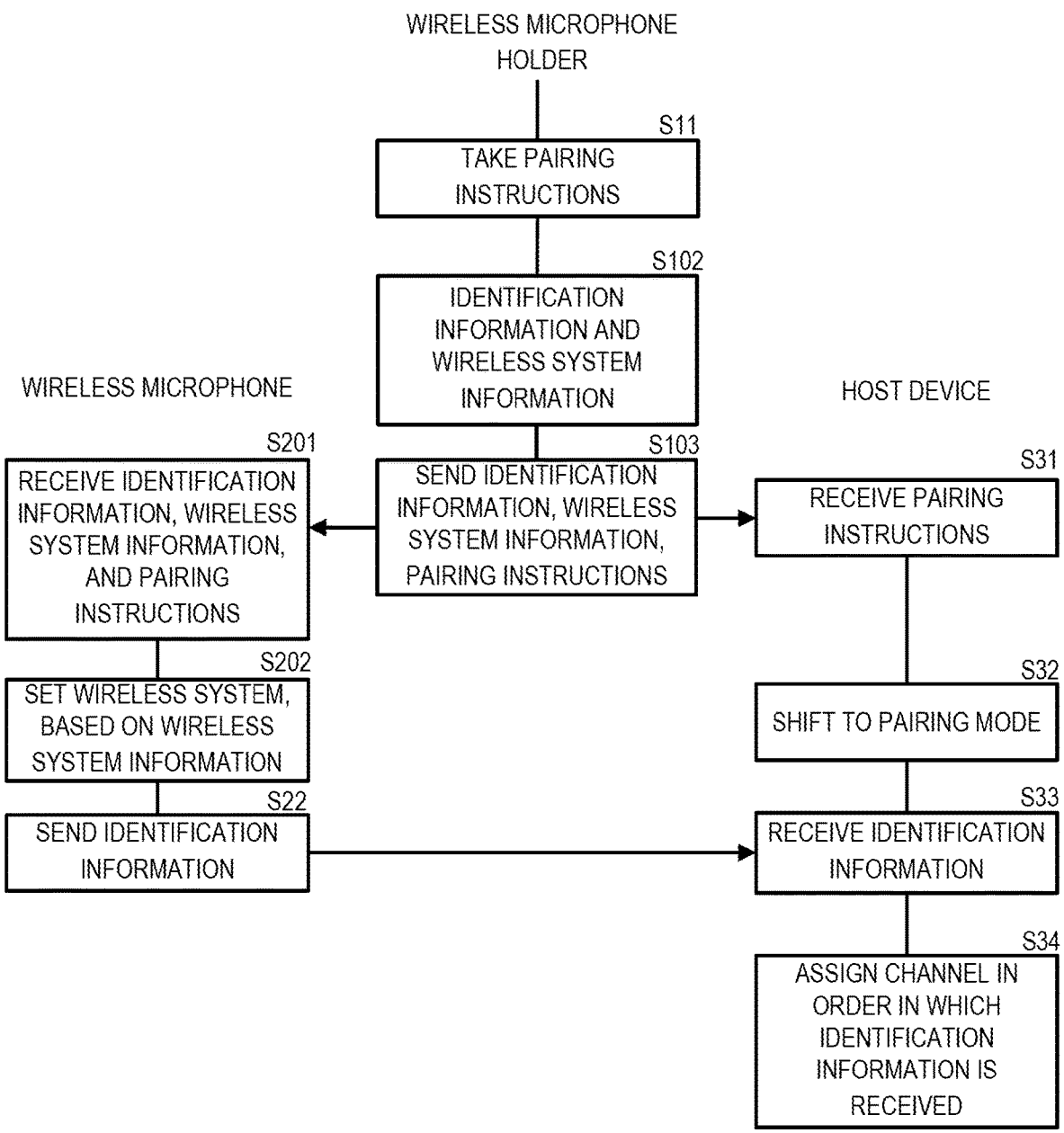

WIRELESS MICROPHONE HOLDER, WIRELESS MICROPHONE CONNECTION METHOD, AND WIRELESS MICROPHONE SYSTEM

CROSS REFERENCE TO RELATED APPLICATIONS

This application claims priority to Japanese Application No. 2021-040946, filed on Mar. 15, 2021, the entirety of which is incorporated herein by reference in its entirety.

BACKGROUND

Technical Field

An embodiment of the present disclosure relates to a wireless microphone holder, a wireless microphone connection method, and a wireless microphone system.

Background Information

Japanese Unexamined Patent Application Publication No. 2017-143725 discloses a battery that performs wireless communication with an information terminal. The battery of Japanese Unexamined Patent Application Publication No. 2017-143725 receives information for connecting to an access point, from the information terminal through a charging apparatus.

Japanese Unexamined Patent Application Publication No. 2004-207866 discloses a transmitter of a wireless microphone. When the transmitter is placed, a charge adapter connected to a receiver receives channel data, and sets a communication channel.

A large number of microphones may be used simultaneously in some cases. The configurations disclosed in Japanese Unexamined Patent Application Publication No. 2017-143725 and Japanese Unexamined Patent Application Publication No. 2004-207866 do not assume the use of a plurality of microphones. It is troublesome to configure connection settings for each of a plurality of microphones.

SUMMARY

In view of the foregoing, an object of an embodiment of the present disclosure is to provide a wireless microphone holder capable of easily configuring connection settings of a plurality of wireless microphones.

A wireless microphone holder according to an embodiment of the present disclosure includes a storage device that stores identification information of a host device, a communication interface that communicates with the host device, and a processor configured to receive a pairing instruction to pair a plurality of wireless microphones with the host device, connect to the plurality of wireless microphones, and send the identification information to the plurality of wireless microphones. In a case in which the processor receives the pairing instruction, the processor sends the identification information and instruction information according to the pairing instruction to the plurality of wireless microphones connected to the processor, sends the instruction information to the host device, and mutually connects the plurality of wireless microphones and the host device.

According to an embodiment of the present disclosure, connection settings of a plurality of wireless microphones are able to be easily configured.

BRIEF DESCRIPTION OF THE DRAWINGS

FIG. 7 is a flow chart showing an operation of wireless microphones 11 to 14 according to the modification, the wireless microphone holder 15A, and the host device 10.

DETAILED DESCRIPTION

Figure 1:
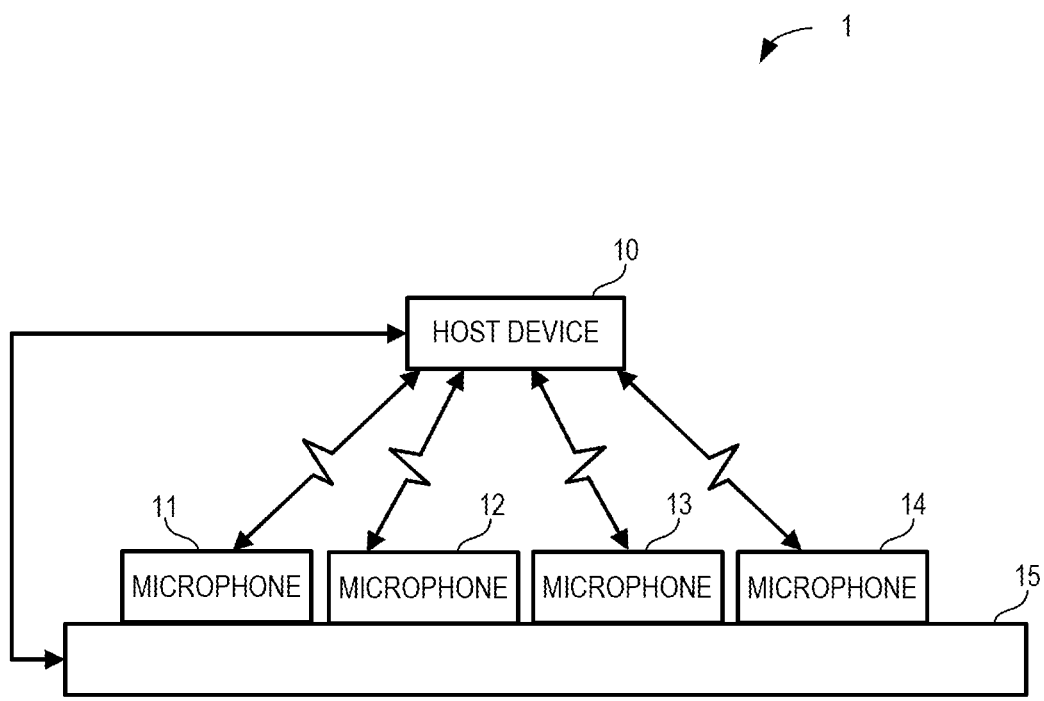
FIG. 1 is a block diagram showing a configuration of a wireless microphone system 1.

FIG. 1 is a block diagram showing a configuration of a wireless microphone system 1 according to various embodiments of the present disclosure. The wireless microphone system 1 includes a host device 10, a plurality of wireless microphones 11 to 14, and a wireless microphone holder 15. The wireless microphone holder 15 holds the plurality of wireless microphones 11 to 14. In addition, the wireless microphone holder 15 functions as a charging stand that charges the plurality of wireless microphones 11 to 14.

The host device 10 and the plurality of wireless microphones 11 to 14 are connected to each other, for example, by predetermined wireless communication standards such as DECT (Digital Enhanced Cordless Telecommunications). The host device 10 and the wireless microphone holder 15 are connected to each other by wired communication through a LAN cable or the like. However, the host device 10 and the wireless microphone holder 15 may be connected wirelessly.

The wireless microphone holder 15 is connected to the wireless microphones 11 to 14 by the communication standards that function as communication and power supply, such as USB. However, the wireless microphone holder 15 may be connected to the wireless microphones 11 to 14 with a dedicated communication terminal and charging terminal. In addition, the wireless microphone 11 and the wireless microphone holder 15 may be connected to each other by wireless communication standards. Moreover, the wireless microphone 11 may receive power supply from the wireless microphone holder 15 by contactless charging standards.

Figure 2:
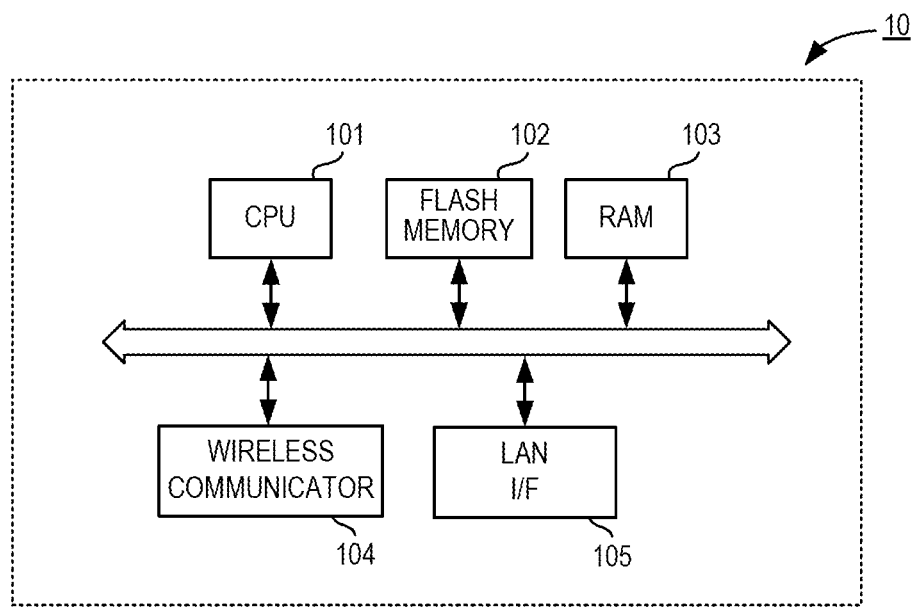
FIG. 2 is a block diagram showing a configuration of a host device 10.
Figure 3:
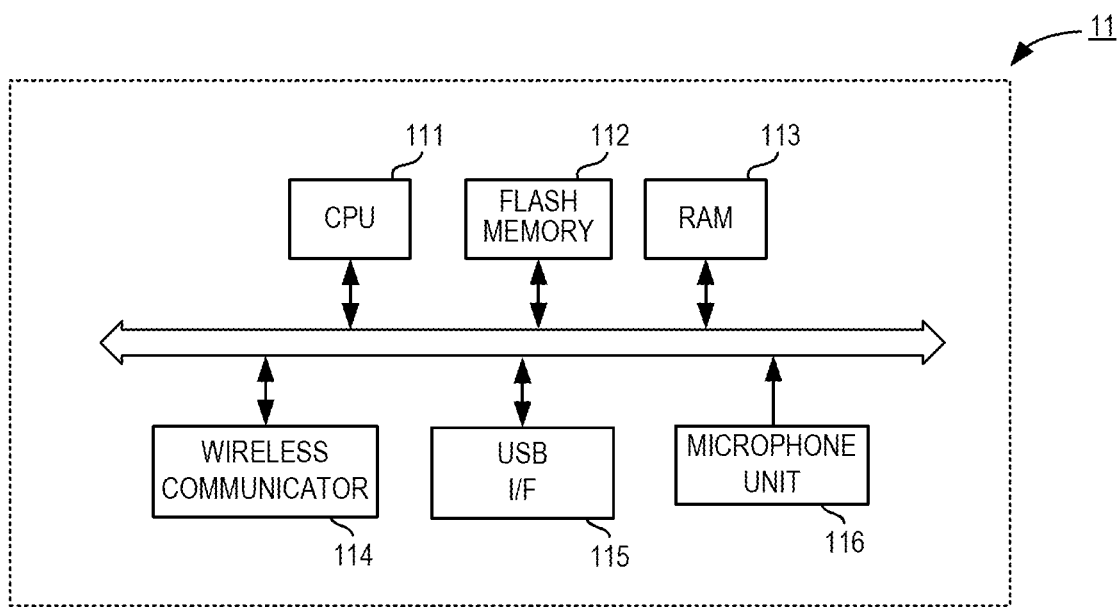
FIG. 3 is a block diagram showing a configuration of a wireless microphone 11.
Figure 4:
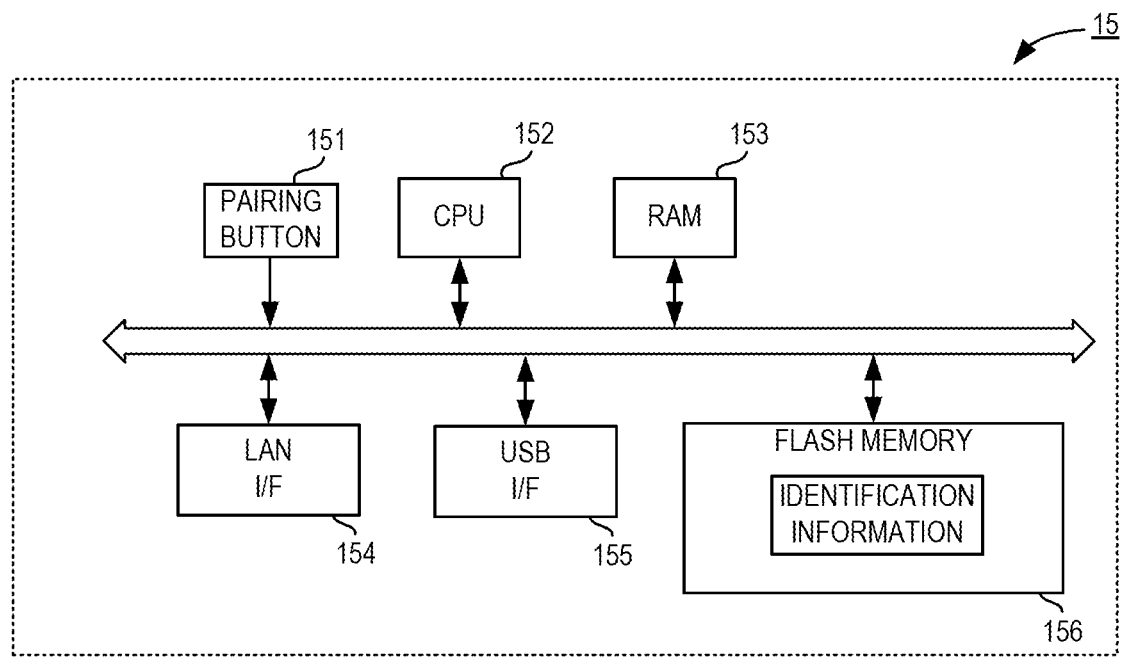
FIG. 4 is a block diagram showing a configuration of a wireless microphone holder 15.

FIG. 2 is a block diagram showing a configuration of the host device 10. FIG. 3 is a block diagram showing a configuration of the wireless microphone 11. FIG. 4 is a block diagram showing a configuration of the wireless microphone holder 15. It is to be noted that, since all the wireless microphones 11 to 14 have the same configuration and function, the configuration of the wireless microphone 11 is shown in FIG. 3 as a representative.

The host device 10 includes a CPU 101, a flash memory 102, a RAM 103, a wireless communicator 104, and a LAN interface (I/F) 105.

The CPU 101 reads a program stored in the flash memory 102, being a storage medium, to the RAM 103 and implements a predetermined function. For example, the CPU 101 receives an audio signal from the wireless microphones 11 to 14 through the wireless communicator 104. The wireless communicator 104 connects to the wireless microphones 11 to 14, for example, by the wireless communication standards such as the DECT, and receives an audio signal. It is to be noted that the connection standards of the host device 10 and the wireless microphones 11 to 14 is not limited to the DECT. For example, the host device 10 and the wireless microphones 11 to 14 may be connected by other wireless communication standards such as Wi-Fi (registered trademark) or Bluetooth (registered trademark).

The CPU 101 sends the audio signal received from the wireless microphones 11 to 14 to a different apparatus through the LAN I/F 105. The LAN I/F 105 connects to the different apparatus by the communication standards such as Dante (registered trademark), for example, and sends the audio signal received from the wireless microphones 11 to 14. It is to be noted that the communication standards of the host device 10 and the different apparatus is not limited to Dante (registered trademark). For example, the host device 10 may connect to the different apparatus by other communication standards such as USB, and may send the audio signal. As a matter of course, the host device 10 may connect to the different apparatus by wireless communication standards, and may send the audio signal.

The different apparatus is an information processing apparatus such as a personal computer, for example. The information processing apparatus outputs the audio signal received from the host device 10 to a speaker. As a result, the information processing apparatus amplifies voice of a talker or the like collected by the wireless microphones 11 to 14, to a venue such as a conference room, for example. Alternatively, the information processing apparatus sends the audio signal received from the host device 10 through the Internet, to a remote place. As a result, the information processing apparatus may function as a remote conversation apparatus.

As illustrated in FIG. 3, the wireless microphone 11 may include a CPU 111, a flash memory 112, a RAM 113, a wireless communicator 114, a USB I/F 115, and a microphone unit 116.

The CPU 111 reads a program stored in the flash memory 112, being a storage medium, to the RAM 113 and implements a predetermined function. For example, the CPU 111 receives an audio signal according to the voice collected by the microphone unit 116. The CPU 111 sends a received audio signal to the host device 10 through the wireless communicator 114. The wireless communicator 104 connects to the host device 10, for example, by the wireless communication standards such as the DECT, as described above, and sends the audio signal.

The USB I/F 115 connects to the wireless microphone holder 15. The USB I/F 115 communicates with the wireless microphone holder 15, and receives power supply from the wireless microphone holder 15.

It is to be noted that a function to communicate with the wireless microphone holder 15 and a function to receive power supply from the wireless microphone holder 15 may be different configurations.

As illustrated in FIG. 4, the wireless microphone holder 15 may include a pairing button 151, a CPU 152, a RAM 153, a LAN I/F 154, a USB I/F 155, and a flash memory 156.

The pairing button 151 is provided in a housing of the wireless microphone holder 15. When the pairing button 151 is pressed, the wireless microphone holder 15 takes a pairing instruction to pair the wireless microphones 11 to 14 with the host device 10.

The CPU 152 reads a program stored in the flash memory 156 being a storage medium to the RAM 153 and implements a predetermined function. For example, the CPU 152 communicates with the host device 10 through the LAN I/F 154. In addition, the CPU 152 communicates with the wireless microphones 11 to 14 through the USB I/F 155. The USB I/F 155 also functions as a power supplier to supply electric power to the wireless microphones 11 to 14.

In addition, the flash memory 156 stores identification information of the host device 10. The identification information of the host device 10 is information required to connect to the host device 10 by communication standards such as the DECT. The CPU 152, in a case in which the pairing instruction are taken by the pairing button 151, reads the identification information stored in the flash memory 156, and sends the identification information to a wireless microphone connected to the USB I/F 155. The wireless microphone connects to the host device 10 by use of received identification information.

Figure 5:
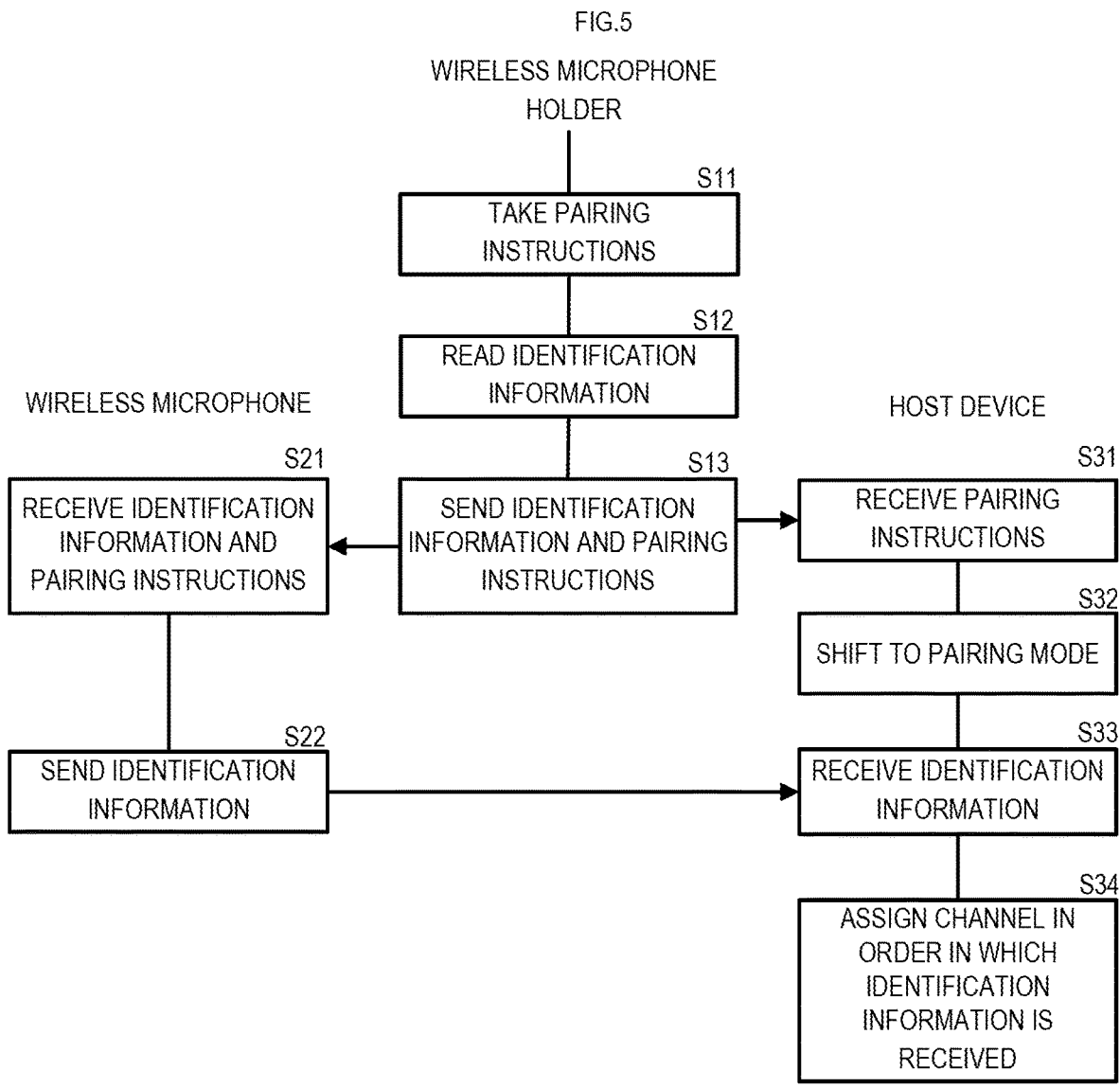
FIG. 5 is a flow chart showing an operation of wireless microphones 11 to 14, the wireless microphone holder 15, and the host device 10.

FIG. 5 is a flow chart showing an operation of the wireless microphones 11 to 14, the wireless microphone holder 15, and the host device 10.

The wireless microphone holder 15 takes pairing instruction through the pairing button 151 (S11). It is to be noted that the pairing instruction do not need to be taken through the pairing button 151. For example, the wireless microphone holder 15 may take the pairing instruction, when detecting mounting of a wireless microphone. In such a case, the wireless microphone holder 15, upon detecting the mounting of a wireless microphone, may take the pairing instruction. Alternatively, the wireless microphone holder 15 may take the pairing instruction through GUI (a WEB UI to take the setting of the host device 10, for example) of the information processing apparatus connected through the LAN. The wireless microphone holder 15, when taking the pairing instruction, reads the identification information of the host device 10 stored in the flash memory 156 (S12). Then, the wireless microphone holder 15 sends the identification information and the pairing instruction to the wireless microphones 11 to 14 and the host device 10 (S13). However, the wireless microphone holder 15 does not need to send the identification information to the host device 10.

The wireless microphones 11 to 14 receive the identification information and the pairing instruction (S21). In addition, the host device 10 receives the pairing instruction (S31). The host device 10, when receiving the pairing instruction, shifts to a pairing mode (S32). The pairing mode is a mode to release encryption of wireless communication and receive the identification information to be sent from a different apparatus. The wireless microphones 11 to 14, when receiving the identification information and the pairing instruction, send the received identification information by broadcast (S22). The host device 10 receives the identification information that the wireless microphones 11 to 14 have sent (S33). The host device 10 assigns a channel of Dante (registered trademark) in order in which the identification information is received (S34).

For example, the host device 10, in a case of receiving first identification information from the wireless microphone 11, assigns Channel 1 of Dante (registered trademark) to the wireless microphone 11. The host device 10, in a case of receiving second identification information from the wireless microphone 12, assigns Channel 2 of Dante (registered trademark) to the wireless microphone 12. The host device 10, in a case of receiving third identification information from the wireless microphone 13, assigns Channel 3 of Dante (registered trademark) to the wireless microphone 13. The host device 10, in a case of receiving fourth identification information from the wireless microphone 14, assigns Channel 4 of Dante (registered trademark) to the wireless microphone 14.

In such a manner, the wireless microphones 11 to 14 and the host device 10 are connected to each other. Hereinafter, a sound collected by the wireless microphone 11 is sent from the host device 10 to another apparatus in Channel 1 of Dante (registered trademark). A sound collected by the wireless microphone 12 is sent from the host device 10 to another apparatus in Channel 2 of Dante (registered trademark). A sound collected by the wireless microphone 13 is sent from the host device 10 to another apparatus in Channel 3 of Dante (registered trademark). A sound collected by the wireless microphone 14 is sent from the host device 10 to another apparatus in Channel 4 of Dante (registered trademark).

As described above, the host device 10 assigns a channel in order of connection. A user does not need to connect a plurality of wireless microphones to use in a particular order, but simply presses the pairing button 151 of the wireless microphone holder 15 once, and can easily connect the plurality of wireless microphones to use to the host device 10.

In the wireless microphone system according to various embodiments, the identification information and the pairing instruction are sent to a wireless microphone connected to the wireless microphone holder 15. In other words, the identification information and the pairing instruction are not sent to a wireless microphone that is not connected to the wireless microphone holder 15. Therefore, the host device 10, when the pairing button 151 of the wireless microphone holder 15 is pressed, is paired with only the wireless microphone connected to the wireless microphone holder 15. For example, in a case in which the wireless microphones 11 to 13 are connected to the wireless microphone holder 15 and the wireless microphone 14 is not connected to the wireless microphone holder 15, the host device 10 is paired with the wireless microphones 11 to 13, and is not paired with the wireless microphone 14.

The wireless microphone system 1 is used in venues of various sizes or for events of various scales. The required number of wireless microphones differs according to the size of a venue or the scale of an event. An event operator connects the required number of wireless microphones to the wireless microphone holder 15 according to the size of the venue or the scale of the event. Subsequently, when the event operator presses the pairing button 151, only the wireless microphone connected to the wireless microphone holder 15 at the time is connected to the host device 10. In such a manner, the event operator can adjust the number of wireless microphones to be easily connected to the host device 10 according to the size of the venue or the scale of the event.

It is to be noted that, while the present embodiment shows the example in which the four wireless microphones 11 to 14 are connected to the host device 10, the number of microphones to be used is not limited to four. For example, Dante (registered trademark) is able to transmit an audio signal of 64 channels in 100 base-TX. Therefore, the host device 10 is able to be connected to up to 64 microphones simultaneously. The wireless microphone system 1 is able to connect the larger number of wireless microphones to the host device 10 than the number of wireless microphones simultaneously connectable to the wireless microphone holder 15. The event operator first mounts the four wireless microphones 11 to 14 to the host device 10, and connects the four wireless microphones 11 to 14 to the host device 10 by pressing the pairing button 151. Subsequently, the event operator replaces the four wireless microphones 11 to 14 with other wireless microphones, and connects the other wireless microphones to the host device 10 by pressing the pairing button 151 again. In such a case as well, the host device 10 assigns a channel of Dante (registered trademark) in order in which the identification information is received. For example, the host device 10, in a case of having already assigned Channel 1 to Channel 4 of Dante (registered trademark) to each of the wireless microphones 11 to 14, assigns Channel 5 of Dante (registered trademark) to other wireless microphones to be connected to the host device 10 next.

In addition, the number of wireless microphone holders 15 is not limited to one. The wireless microphone system 1 may include a plurality of wireless microphone holders 15. The event operator may mount a wireless microphone to each of the plurality of wireless microphone holders 15, and may press each pairing button 151 of the plurality of wireless microphone holders 15. In such a case as well, the host device 10 assigns a channel of Dante (registered trademark) in order in which the identification information is received.

The host device 10, in a case in which the number of channels to connect reaches the maximum number of connectable channels, may refuse connection to any more wireless microphones. Alternatively, the host device 10, in a case in which the number of channels to connect reaches the maximum number of connectable channels, may release connection to a wireless microphone that has been already connected, and may assign a channel to a new wireless microphone. For example, the host device 10 may release connection to the wireless microphone to which Channel 1 is assigned, and may assign Channel 1 to a wireless microphone to be newly connected.

In addition, the host device 10 may include a mode change switch. The host device 10, in a case in which the number of channels to connect reaches the maximum number of connectable channels, may take either a first mode to refuse connection to a new wireless microphone or a second mode to release connection to the already connected wireless microphone and make connection to a new wireless microphone, through the mode change switch. In addition, the host device 10 may take mode switch instructions through the GUI of the information processing apparatus connected through LAN.

In addition, the wireless microphone holder 15, according to how the pairing button 151 is pressed, may designate whether to add a new wireless microphone or to redo the assignment of Channel 1. For example, in a case in which the pairing button 151 continues being pressed for 1 second, the wireless microphone holder 15 sends pairing instructions to the wireless microphone and the host device 10 that are connected at the time. In such a case, the host device 10 is connected to a new wireless microphone in addition to the currently connected wireless microphone. On the other hand, in a case in which the pairing button 151 continues being pressed for 5 seconds, the wireless microphone holder 15 sends pairing instructions including initial setting instructions to the host device 10. In such a case, the host device 10 releases connection to the currently connected wireless microphone, and newly assigns the wireless microphones connected at the time, in order from Channel 1. As a result, the event operator can easily provide instructions on whether to add a wireless microphone or to redo the setting from the beginning.

Figure 6:
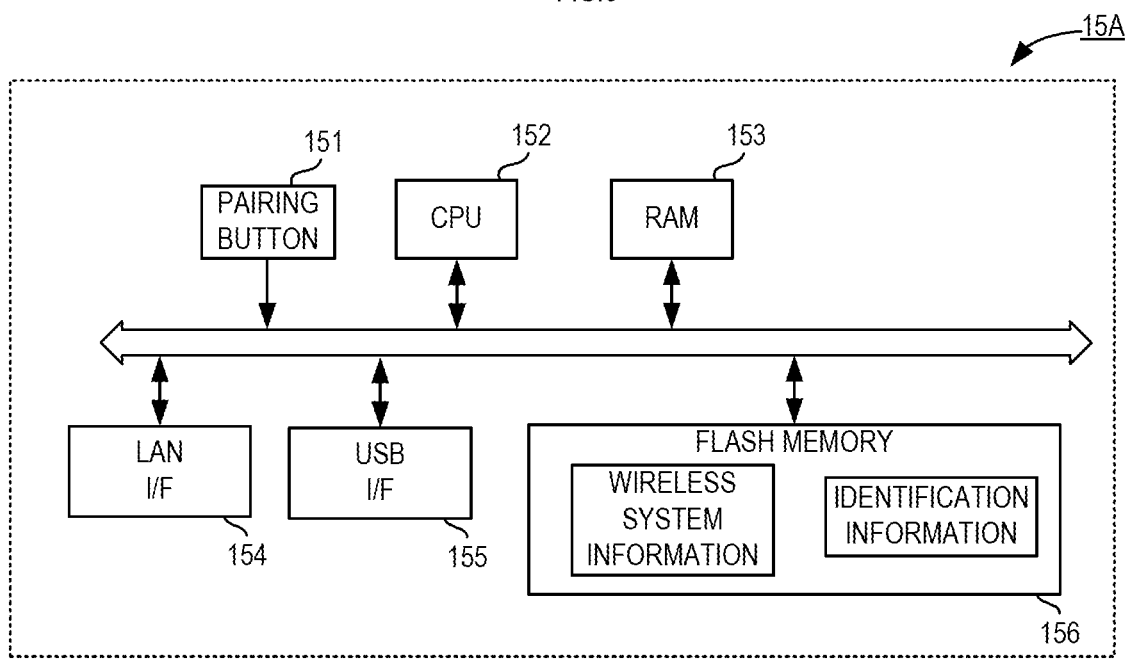
FIG. 6 is a block diagram showing a configuration of a wireless microphone holder 15A according to a modification.

Next, FIG. 6 is a block diagram showing a configuration of a wireless microphone holder 15A according to a modification. The flash memory 156 of the wireless microphone holder 15A further stores wireless system information. Other configurations are the same as the configurations of the wireless microphone holder 15, and the description will be omitted.

The wireless system information is information showing a system (such as standards, an encryption system, or a frequency) of wireless communication to be used. The system of wireless communication to be used is different for each country or region to which a product is shipped. The host device 10 and the wireless microphone holder 15 are previously set to a wireless communication system suitable for each country or region to which a product is shipped, at the time of factory shipment. On the other hand, the wireless microphones 11 to 14 are not set to the wireless communication system at the time of factory shipment.

FIG. 7 is a flow chart showing an operation of wireless microphones 11 to 14 according to the modification, the wireless microphone holder 15A, and the host device 10. Like reference numerals are used to refer to the operation common to FIG. 5, and the description will be omitted.

The wireless microphone holder 15, when taking pairing instructions, reads identification information and wireless system information (S102). Then, the wireless microphone holder 15 sends the identification information, the wireless system information, and the pairing instruction, to the currently connected wireless microphone (S103). The wireless microphones 11 to 14 receive the identification information, the wireless system information, and the pairing instruction (S201). The wireless microphones 11 to 14 set a wireless communication system, based on received wireless system information (S202). As a result, the wireless microphones 11 to 14 are set to the wireless communication system suitable for each country or region to which a product is shipped, and are able to be connected to the host device 10.

In such a manner, the wireless microphones 11 to 14 are set to the wireless communication system suitable for each country or region to which a product is shipped, at the beginning of use of the product. Therefore, the wireless microphones 11 to 14 do not need to be set to the wireless communication system at the time of factory shipment. Accordingly, a manufacturer of the wireless microphone system does not need to previously set each of a large number of wireless microphones to be used, to the wireless communication system suitable for each country or region. Therefore, the manufacturer can manufacture and ship a wireless microphone, without distinguishing a country or a region of a shipping destination.

Finally, the descriptions of the embodiments of the present disclosure are illustrative in all points and should not be construed to limit the present disclosure. The scope of the present disclosure is defined not by the foregoing embodiments but by the following claims for patent. Further, the scope of the present disclosure includes the scopes of the claims for patent and the scopes of equivalents.

What is claimed is:

1. A wireless microphone holder comprising:
   a storage device that stores identification information of a host device;
   a communication interface configured to communicate with the host device; and
   a processor configured to:
      receive a pairing instruction to pair a plurality of wireless microphones with the host device;
      connect to the plurality of wireless microphones; and
      send the identification information to the plurality of wireless microphones,
   wherein, in a case in which the processor receives the pairing instruction, the processor is configured to:
      send the identification information and instruction information according to the pairing instruction to the plurality of wireless microphones connected to the processor;
      send the instruction information to the host device via the communication interface; and
      mutually connect the plurality of wireless microphones and the host device.

2. The wireless microphone holder according to claim 1, wherein the processor is configured to assign a channel that is different in each of the plurality of wireless microphones to the host device.

3. The wireless microphone holder according to claim 1, wherein the processor is configured to wirelessly connect to the host device.

4. The wireless microphone holder according to claim 1, further comprising a power supply configured to supply electric power to the plurality of wireless microphones.

5. The wireless microphone holder according to claim 1, wherein the processor is configured to send same identification information to two or more wireless microphones among the plurality of wireless microphones.

6. The wireless microphone holder according to claim 1, wherein the processor is configured to, in response to receiving the pairing instruction, send information that shows a system of wireless communication to the plurality of wireless microphones connected to the processor.

7. A wireless microphone connection method comprising:
   receiving, by a wireless microphone holder, a pairing instruction to pair a plurality of wireless microphones with a host device;
   sending, by the wireless microphone holder, identification information of the host device that is stored in a storage device of the wireless microphone holder, and instruction information according to the pairing instruction, to the plurality of wireless microphones connected to the wireless microphone holder;
   sending the instruction information from the wireless microphone holder to the host device; and
   mutually connecting the plurality of wireless microphones and the host device.

8. The wireless microphone connection method according to claim 7, further comprising assigning a channel that is different in each of the plurality of wireless microphones to the host device.

9. The wireless microphone connection method according to claim 7, wherein the wireless microphone holder is wirelessly connected to the host device.

10. The wireless microphone connection method according to claim 7, wherein the wireless microphone holder supplies electric power to the plurality of wireless microphones.

11. The wireless microphone connection method according to claim 7, wherein the wireless microphone holder sends same identification information to two or more wireless microphones among the plurality of wireless microphones.

12. The wireless microphone connection method according to claim 7, wherein the wireless microphone holder sends information that shows a system of wireless communication to the plurality of wireless microphones.

13. A wireless microphone system comprising:
a plurality of wireless microphones;
a host device; and
a wireless microphone holder, wherein:
the wireless microphone holder is configured to receive a pairing instruction;
the wireless microphone holder is configured to send identification information of the host device that is stored in a storage device of the wireless microphone holder, and instruction information according to the pairing instruction, to the plurality of wireless microphones connected to the wireless microphone holder;
the wireless microphone holder is configured to send the instruction information to the host device; and
the plurality of wireless microphones and the host device are configured to connect to each other.

14. The wireless microphone system according to claim 13, wherein the wireless microphone holder is configured to assign a channel that is different in each of the plurality of wireless microphones to the host device.

15. The wireless microphone system according to claim 13, wherein the wireless microphone holder is configured to wirelessly connect to the host device.

16. The wireless microphone system according to claim 13, wherein the wireless microphone holder is configured to supply electric power to the plurality of wireless microphones.

17. The wireless microphone system according to claim 13, wherein the wireless microphone holder is configured to send same identification information to two or more wireless microphones among the plurality of wireless microphones.

18. The wireless microphone system according to claim 13, wherein the wireless microphone holder is configured to send information that shows a system of wireless communication to the plurality of wireless microphones.

* * * * *